United States Patent

Uemura

[15] 3,696,218

[45] Oct. 3, 1972

[54] MAGNETIC FLUX-RESPONSIVE HEADS

[72] Inventor: Saburo Uemura, Yokohama, Japan

[73] Assignee: Sony Corporation, Tokyo, Japan

[22] Filed: Aug. 31, 1970

[21] Appl. No.: 68,327

[30] Foreign Application Priority Data

Sept. 4, 1969 Japan ......................44/70116

[52] U.S. Cl. ......179/100.2 CF, 324/43, 340/174.1 F

[51] Int. Cl. ...........................G11b 5/34, G01r 33/02

[58] Field of Search ................179/100.2 CF; 324/43; 340/174.1 F

[56] References Cited

UNITED STATES PATENTS

| | | | |
|---|---|---|---|
| 2,855,466 | 10/1958 | Wiegand | 179/100.2 CF |
| 2,590,091 | 3/1952 | Devol | 340/174.1 F |
| 2,975,241 | 3/1961 | Camras | 179/100.2 C |

*Primary Examiner*—J. Russell Goudeau

*Attorney*—Lewis H. Eslinger, Alvin Sinderbrand and Curtis, Morris and Safford

[57] ABSTRACT

An improved dual-gap magnetic flux-responsive head which can be used not only for detecting reference magnetizations previously formed but also for making the reference magnetizations on a magnetic medium. The improved head has respective coil members on its magnetic core and yoke assembly for producing magnetic flux to detect the magnetizations and to make the magnetizations.

6 Claims, 8 Drawing Figures

PRIOR ART FIG. 1
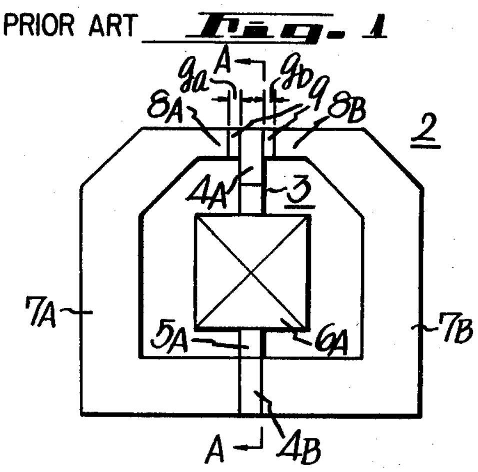
FIG. 2 PRIOR ART
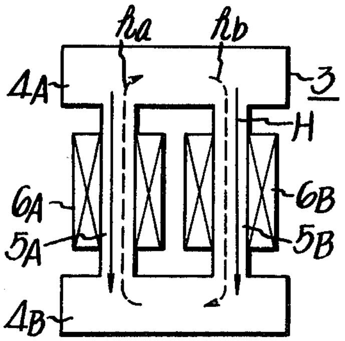
PRIOR ART FIG. 3
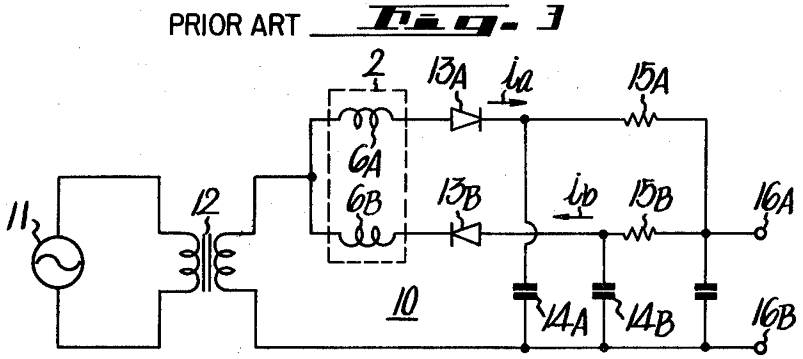
PRIOR ART FIG. 4
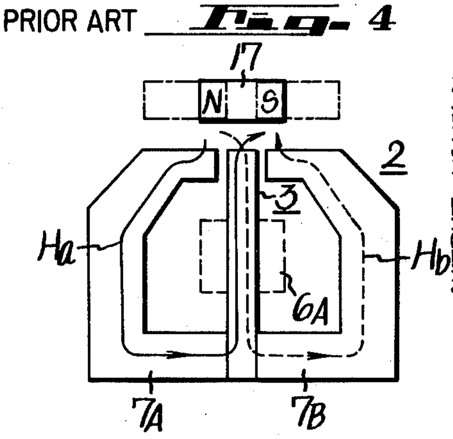
FIG. 5 PRIOR ART
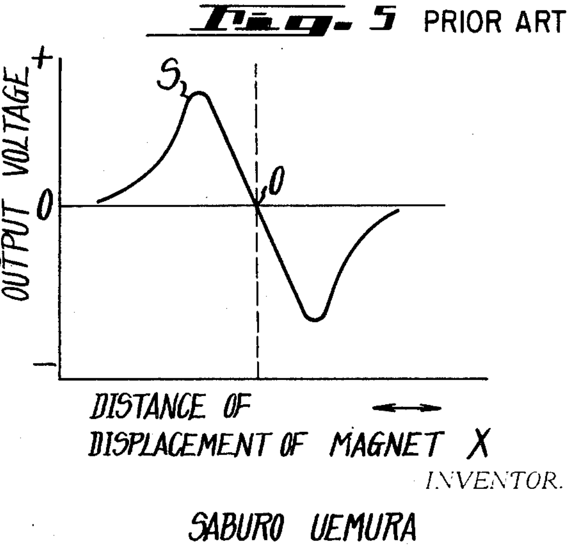
INVENTOR.
SABURO UEMURA
BY

INVENTOR.
SABURO UEMURA

BY

MAGNETIC FLUX-RESPONSIVE HEADS

BACKGROUND OF THE INVENTION

1. Field of the Invention

This invention relates generally to magnetic flux-responsive heads, for example, such as those used in a magnetic scaling or measuring system, and more particularly to improvements in dual-gap magnetic flux-responsive heads which are utilized not only for detecting a reference magnetization or signal previously formed or recorded on a magnetic medium, but also for making the reference magnetization or recording the signal on the magnetic medium.

2. Description of the Prior Art

Magnetic flux-responsive heads of the type to which this invention relates generally comprise a saturable magnetic core with plural coils thereon and a pair of yokes forming, in connection with the core disposed therebetween, a loop path for magnetic flux, with dual gaps being defined between the opposite sides of one end portion of the core and adjacent ends of the yokes. Such a head is supplied with an exciting alternating current to the plural coils for producing a magnetic flux going around the loop path, and detects magnetizations formed adjacent the dual gaps as changes of its electrical output.

Accordingly, the combination of the foregoing magnetic flux-responsive head and the magnetic medium, for example a magnetic scale, with the reference magnetizations formed at predetermined locations thereon, permits the making of magnetic measuring devices or magnetic displacement detectors, for example, as specifically disclosed in the copending U.S. application, Ser. No. 22,280, filed Mar. 24, 1970 and having a common assignee herewith.

A magnetic medium of, for example, a band configuration intermittently magnetized with north and south magnetic poles at predetermined positions is mounted on a moving part of an automatic machine tool or the like and a magnetic flux-responsive head is mounted on a fixed part of the automatic machine tool or the like in contact with the magnetic medium. The magnetizations on the magnetic medium move with the movement of the moving part and are detected by the magnetic flux-responsive head when moved past the head. The output of the magnetic flux-responsive head is related to the movement of the automatic machine tool with the magnetic medium mounted thereon, so that the movement of the automatic machine tool can be detected and controlled.

In the prior art, however, conventional magnetic flux-responsive heads could not have been employed for intermittently magnetizing the magnetic medium at predetermined positions, so that the magnetization has been affected by other magnetizing means. It is difficult to form the magnetizations on the magnetic medium precisely at predetermined positions by the magnetizing means different from the magnetic head and the magnetizations cannot always be formed with accuracy. This results in a detecting error and prevents accurate detection or measurement.

SUMMARY OF THE INVENTION

Accordingly, it is an object of this invention to provide magnetic flux-responsive heads which can be used for making reference magnetizations at predetermined locations on a magnetic medium and also for detecting the reference magnetizations formed on the magnetic medium.

Another object of this invention is to provide magnetic flux-responsive heads of the type described in the above object which are of simple construction.

Still another object of this invention is to provide magnetic flux-responsive heads of the type described in the first object in which both magnetic fluxes for making and detecting the reference magnetizations pass through a common magnetic yoke assembly.

A further object of this invention is to provide magnetic flux-responsive heads of the type described in the first object which have independent magnetic yoke assemblies respectively forming a loop path for magnetic flux for making and detecting the reference magnetizations.

The above and other objects, features and advantages of this invention will be apparent in the following detailed description of illustrative embodiments of this invention which is to be read in connection with the accompanying drawings.

BRIEF DESCRIPTION OF THE DRAWINGS

FIG. 1 is a plan view of a magnetic flux-responsive head of the type to which this invention relates, and which is existing or conventional construction;

FIG. 2 is a sectional view taken along the line A—A in FIG. 1;

FIG. 3 is a wiring diagram showing a detecting circuit that may be used in association with the head of FIG. 1 to provide an output voltage characteristic of magnetic flux received by the head from the source thereof;

FIG. 4 is a schematic diagram, for explaining the operation of the head depicted in FIG. 1;

FIG. 5 is a waveform diagram, for similarly explaining the operation of the head of FIG. 1;

DESCRIPTION OF THE PREFERRED EMBODIMENTS

Figure 6:
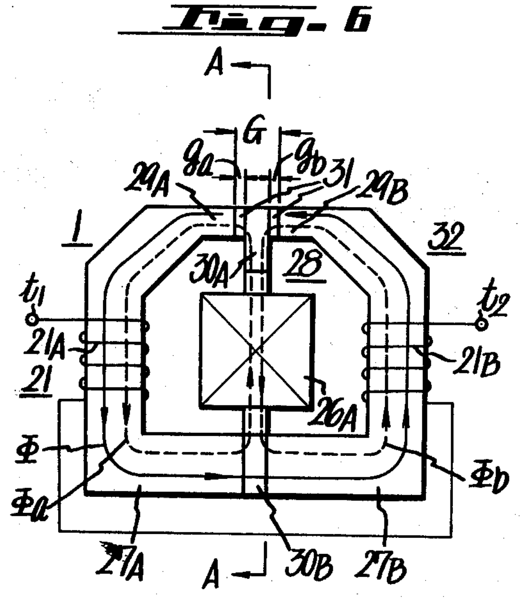
FIG. 6 is a plan view showing one example of a magnetic head according to this invention.

With reference to FIGS. 1 to 5 a description will be given first of the construction and operation of a prior art magnetic flux-responsive head of a type to which this invention pertains. FIGS. 1 and 2 reference numeral 3 indicates a plate-like saturable magnetic core, which is made up of a pair of magnetic members 4A and 4B and magnetic legs 5A and 5B extending therebetween to magnetically couple them as shown in FIG. 2. On the magnetic legs 5A and 5B of the saturable magnetic core 3 are wound detecting coils 6A and 6B, respectively and the magnetic members 4A and 4B are held between a pair of substantially C-shaped magnetic yokes 7A and 7B. In this case spacers 9 are interposed between opposite ends 8A and 8B of the magnetic yokes 7A and 7B and the magnetic member 4A to define working gaps 9A and 9B therebetween, while the other ends of the magnetic yokes 7A and 7B are directly attached to both sides of the magnetic member 4B.

A detector circuit 10 such as shown in FIG. 3 is connected to the magnetic flux-responsive head 2. In FIG. 3 reference numeral 11 indicates an AC power source for exciting the detecting coils 6A and 6B. The AC power source 11 is connected to the primary of a transformer 12 and one end of a secondary coil of the transformer is connected in series with a first circuit consisting of the detecting coil 6A of the magnetic head 2, a diode 13A and a capacitor 14A. The transformer secondary is also connected in series with a second circuit consisting of the detecting coil 6B, a diode 13B and a capacitor 14B. The connection point of the diode 13A with the capacitor 14A is connected to one output terminal 16A through a resistor 15A. The corresponding connection point of the diode 13B and the capacitor 14B is connected via a resistor 15B to the same output terminal 16A. The other terminals of the capacitors 14A and 14B are connected to the other end of the secondary of the transformer 12, which is also the other output terminal 16B.

In the positive half-cycle of an AC output derived at the secondary of the transformer 12, a current $i_a$ flows through the detecting coil 6A, the diode 13A and the capacitor 14A, while in the negative half cycle a current $i_b$ flows through the capacitor 14B, the diode 13B and the detecting coil 6B. Accordingly, voltages of opposite polarities corresponding to the magnitude of the currents $i_a$ and $i_b$ derived across the capacitors 14A and 14B, respectively. In FIG. 2 reference characters $h_a$ and $h_b$ designate magnetic fluxes (indicated by broken lines) produced by the currents $i_a$ and $i_b$ flowing in the detecting coils 6A and 6B.

In this case, when the magnetic head 2 does not lie in a DC magnetic field the currents $i_a$ and $i_b$ flowing across the capacitors 14A and 14B are equal to each other, so that no output voltage is derived between the output terminals 16A and 16B.

When an external DC magnetic flux H (indicated by solid lines) is supplied to the magnetic head 2 in the magnetic legs 5A and 5B of the saturable magnetic core 3 as shown in FIG. 2, the currents $i_a$ and $i_b$ are different in magnitude because of their different saturation states, so that a difference is produced between the voltages derived across the capacitors 14A and 14B. Since this voltage difference is obtained in proportion to the intensity of the external DC magnetic field H, the intensity of the external DC magnetic field H can be determined by measuring the output voltage derived between the terminals 16A and 16B.

When a magnetized element, or magnet, 17 is located opposite the magnetic head 2 with the center of the magnet 17 aligned with that of the saturable magnetic core 3, as illustrated in FIG. 4, magnetic fluxes $H_a$ (indicated by a solid line) and $H_b$ (indicated by a broken line) induced by the magnet 17 and respectively flowing through the magnetic yokes 7A and 7B and the saturable magnetic core 3 are equal in magnitude to each other and are opposite in direction in the saturable magnetic core 3. As a result the magnetic fluxes $H_a$ and $H_b$ cancel each other in the saturable core 3. Accordingly, in this case the condition of the magnetic head 2 is equivalent to that when no external magnetic field is supplied to the saturable magnetic core 3. This condition is indicated at a point 0 in the graph of FIG. 5 in which the abscissa represents the distance $x$ of the movement of the magnet 17 in the direction of magnetization and the ordinate the magnitude and direction of a direct output voltage E derived between the terminals 16A and 16B.

When the magnet 17 moves from the point 0 to the left in FIG. 4, the magnetic flux $H_a$ exceeds the flux $H_b$ and when the magnet 17 lies in the vicinity of a one-dot chain line, the direct output voltage E is at maximum. When the magnetic 17 shifts to the right from the point 0 the magnetic flux Hb exceeds that $H_a$ and when the magnet 17 assumes a position near a two-dot chain line, the direct output voltage E is at minimum. Consequently, there is derived from between the terminals 16A and 16B a direct output voltage which varies with the movement of the magnet 17 as indicated by a curve S.

The present invention provides a magnetic flux-responsive head of the type described above which is adapted to be used not only for reproducing but also for recording.

In accordance with the present invention as illustrated in FIG. 6, a recording coil 21 is mounted on a magnetic head 32 for supplying its working gaps $g_a$ and $g_b$ with circulating magnetic fluxes $\Phi$ (indicated by solid lines) during recording. In the illustrated example coils 21A and 21B of the same number of turns are wound on magnetic yokes 27A and 27B and are connected, for example, in series to each other in such a manner that magnetic fluxes induced by the coils 21A and 21B may be in the same direction in the magnetic yokes 27A and 27B. The coils 21A and 21B constitute the recording coil 21. Reference characters $t_1$ and $t_2$ designate input terminals of the recording coil 21. The magnetic head for both recording and reproducing use according to this invention is generally designated by reference numeral 1.

When no circuit is connected across the input terminals $t_1$ and $t_2$ of the recording coil 21 or when a circuit of high output impedance is connected thereto, the magnetic head 1 performs the usual magnetic field detection in the same manner as the magnetic head 2 of FIG. 1. If the recording coil 21 is connected to a pulse signal supply means (not shown) and is supplied with a pulse signal therefrom through the input terminals $t_1$ and $t_2$ during recording, a magnetic flux $\Phi_a$ induced by the current flowing in the coil 21A circulates, counterclockwise in the magnetic yoke 27A and the saturable magnetic core 28 as indicated by broken line in FIG. 6. A magnetic flux $\Phi_b$ induced by the current flowing in the coil 12B also circulates in the same direction as the flux $\Phi_a$, namely counterclockwise in the magnetic yoke 27B and the saturable magnetic core 28 as indicated by broken lines in the figure. In this case the magnetic fluxes $\Phi_a$ and $\Phi_b$ are equal in magnitude to each other and flow through the saturable magnetic core 28 in reverse directions, so that the magnetic fluxes $\Phi_a$ and $\Phi_b$ are cancelled by each other in the saturable magnetic core 28 and a magnetic flux $\Phi$ circulates, for example, counterclockwise in the magnetic yokes 27A and 27B.

Since one end 30A of the saturable magnetic core 28 is interposed between the ends 29A and 29B of the magnetic yokes 27A and 27B, the magnetic flux $\Phi$ passes through the end 30A of the core 28 in the direction of its thickness to saturate it. Accordingly, the magnetic yokes 27A and 27B and the recording coil 21 constitute a recording head, and a gap G defined between the opposing ends 29A and 29B of the magnetic yokes 27A and 27B essentially functions as a single working gap.

Consequently, magnetizations can be formed on the magnetic medium at predetermined places by positioning at predetermined locations the moving and fixed portions having respectively mounted thereon the magnetic medium and the magnetic head 1 and by supplying the pulse signal to the magnetic head from the pulse signal supply means. Since the magnetizations are formed by the magnetic head 1, the relative position of the magnetic medium to the magnetic head 1 is exactly the same during recording and reproducing and the magnetizations can be formed accurately at the predetermined positions with ease. In this case the gap length of the working gap G for recording is different from those of the gaps $g_a$ and $g_b$ for reproducing but this difference does not matter in practice and these gap lengths need not always be rendered equal to each other.

With the foregoing arrangement, the magnetic flux-responsive head can be used for recording with a simple construction. However, the magnetic yokes 27A and 27B of the magnetic head are usually formed of ferrite, permalloy or a like material that has a saturation magnetic flux density that is not very great, so that when the saturation magnetic flux density in the magnetic yokes 27A and 27B is smaller than that in the magnetic medium, as in the case of the magnetic medium formed of barium ferrite, for example, there is a possibility that the magnetic yokes 27A and 27B will be saturated by the pulse signal for recording use, which will result in insufficient recording. On the other hand, in the case where the magnetic yokes 27A and 27B are formed of pure iron of great saturation magnetic flux density, for example, saturation of the magnetic yokes 27A and 27B can be avoided but a loss is caused in an exciting current supplied to the magnetic head during reproducing.

Figure 7:
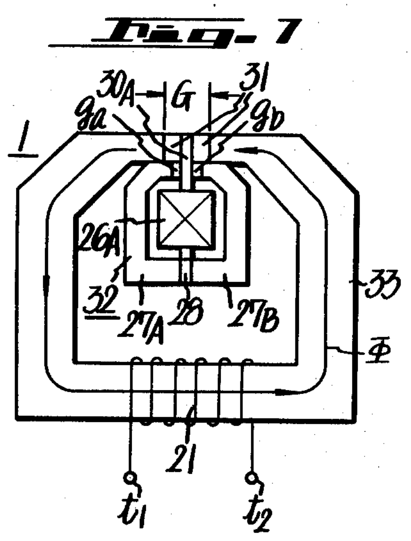
FIGS. 7 and 8 are plan views, similar to FIG. 6, illustrating other examples of magnetic heads according to this invention.
Figure 8:
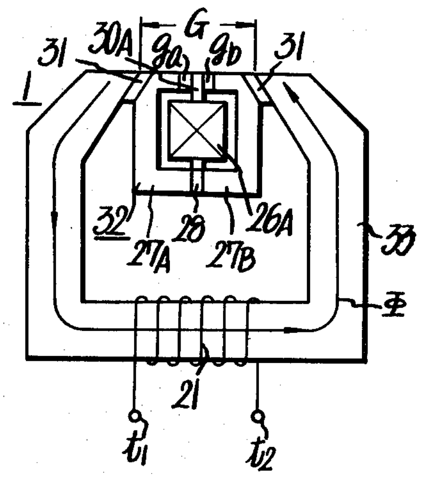

FIGS. 7 and 8 illustrate modifications of the magnetic head of this invention in which a magnetic yoke 33 is provided separately from those 27A and 27B to avoid of the drawbacks mentioned above.

In FIG. 7 the magnetic yoke 33 is placed around a normal magnetic flux-responsive head 32 in such a manner that the working gap G of the yoke 33 is substantially aligned with the gaps $g_a$ and $g_b$ of the head 32, the front end 30A of the saturable magnetic core 28 projects in the working gap G of the magnetic yoke 33 to its front and a recording coil 21 is wound on the magnetic yoke 33. In this case, the magnetic yoke 33 is formed of, pure iron or like material whose saturation magnetic flux density is greater than that of the magnetic medium. Reference numeral 31 indicates spacers.

With such an arrangement, during reproducing the magnetic head 32 is supplied with an external magnetic flux through the ends of the magnetic yoke 33 and performs reproducing operation, while during recording a circulating magnetic flux Φ is applied by the recording coil 21 to the magnetic yoke 33 to achieve recording operation. In such a case, the magnetic head 32 is magnetically bypassed by the magnetic yoke 33 but its influence can be avoided by increasing the width of the pulse signal for recording or its level. Further, the magnetic yoke 33 disposed around the magnetic head 32 serves to shield the latter during reproducing, thereby to avoid an error in the reproducing operation.

The magnetic head 32 shown in FIG. 8 is substantially identical in construction with that of FIG. 7 except that the magnetic yoke 33 is provided in such a manner that the front of the magnetic head 32 is substantially flush with that of the magnetic yoke 33. It will be seen that the same results as those in the above example can be obtained in this case, too.

With the present invention, recording can be achieved by the magnetic flux-responsive head as above described, so that the recording is very easy and a reproduced signal can be derived from exactly the same position as the recorded one, and accordingly it is possible to obtain a signal accurately indicating a position. Further, the magnetic head of this invention is very simple in construction and inexpensive, as will be understood from the foregoing.

It will be apparent that many modifications and variations may be effected without departing from the scope of the novel concepts of this invention.

I claim as my invention:

1. A magnetic flux-responsive head comprising a saturable magnetic core with a plurality of coils wound thereon, means for energizing said coils to produce magnetic flux in opposite directions along said core, a magnetic yoke assembly forming, with said core disposed therebetween, a loop path for magnetic flux and having two gaps defined between the opposite sides of one end portion of said core and adjacent ends of said yoke assembly, and magnetic means including additional coil means for producing a magnetic flux which passes through said one end portion of the core in the direction extending between said opposite sides so as to saturate said one end portion and include the latter in a single effective gap to form magnetizations.

2. A magnetic flux-responsive head as claimed in claim 1, wherein said additional coil means is wound on at least one portion of said magnetic yoke assembly forming a loop path for magnetic flux, with magnetic flux produced by said additional coil means circulating in said magnetic yoke assembly and producing no resultant magnetic flux in said core in the direction between the opposite ends of the latter.

3. A magnetic flux-responsive head as claimed in claim 2 wherein said additional coil means wound on the magnetic yoke assembly comprises a pair of coil members respectively wound on different portions of said magnetic yoke assembly, said coil members being electrically connected to each other.

4. A magnetic flux-responsive head as claimed in claim 1 wherein said magnetic flux producing means further comprises an additional magnetic yoke assembly forming a loop path for magnetic flux and surrounding said magnetic yoke assembly, said additional magnetic yoke assembly having said single effective gap defined between adjacent ends thereof with said one end portion of the core extending therebetween, and said additional coil means is wound on said additional magnetic yoke assembly.

5. A magnetic flux-responsive head as claimed in claim 4 wherein said single effective gap defined by said additional yoke assembly is aligned with said two gaps of said magnetic yoke assembly.

6. A magnetic flux-responsive head as claimed in claim 4, wherein a portion of said magnetic yoke assembly which, with said one end portion of the core, defines said two gaps extends into said single effective gap defined between said adjacent ends of the additional magnetic yoke assembly.

* * * * *